(12) United States Patent
Mueller et al.

(10) Patent No.: US 7,832,524 B2
(45) Date of Patent: Nov. 16, 2010

(54) SOUND ABSORBER FOR GAS TURBINE INSTALLATIONS

(75) Inventors: Christian Mueller, Ennetbaden (CH);
Matthias Rothbrust, Dietikon (CH);
Ivan Rozman, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/068,534

(22) Filed: Feb. 7, 2008

(65) Prior Publication Data
US 2008/0202848 A1 Aug. 28, 2008

Related U.S. Application Data

(63) Continuation of application No. PCT/EP2006/063894, filed on Jul. 5, 2006.

(30) Foreign Application Priority Data

Aug. 8, 2005 (CH) .................................. 1308/05

(51) Int. Cl.
*F01D 25/04* (2006.01)
(52) U.S. Cl. ...................................... 181/229
(58) Field of Classification Search ................ 181/214, 181/218, 224, 225, 229; 415/119
See application file for complete search history.

(56) References Cited

U.S. PATENT DOCUMENTS

| | | | | |
|---|---|---|---|---|
| 2,674,335 A * | 4/1954 | Lemmerman | ................ | 181/217 |
| 2,674,336 A * | 4/1954 | Lemmerman | ................ | 181/222 |
| 3,011,584 A * | 12/1961 | Lemmerman et al. | ....... | 181/217 |
| 3,159,238 A * | 12/1964 | Shearer | ....................... | 181/213 |
| 3,511,336 A * | 5/1970 | Rink et al. | ................... | 181/224 |
| 3,688,865 A * | 9/1972 | Smith et al. | .................. | 181/218 |
| 3,698,509 A * | 10/1972 | Fitting et al. | ................ | 181/214 |
| 3,841,434 A * | 10/1974 | Culpepper, Jr. | ............. | 181/224 |
| 4,068,736 A * | 1/1978 | Dean et al. | ................... | 181/224 |
| 4,441,578 A | 4/1984 | Rose | | |
| 4,751,979 A * | 6/1988 | Wiseman | ..................... | 181/213 |
| 4,753,319 A * | 6/1988 | Vinciguerra | ................. | 181/218 |
| 5,297,517 A * | 3/1994 | Brandt et al. | ............. | 123/198 F |
| 5,491,308 A * | 2/1996 | Napier et al. | ............... | 181/224 |
| 5,594,216 A * | 1/1997 | Yasukawa et al. | ........... | 181/213 |

(Continued)

FOREIGN PATENT DOCUMENTS

DE 44 33 103 A1 3/1996

(Continued)

OTHER PUBLICATIONS

PCT/ISA 201, PCT/ISA/210 and PCT/ISA/237.

*Primary Examiner*—Jeffrey Donels
*Assistant Examiner*—Jeremy Luks
(74) *Attorney, Agent, or Firm*—Buchanan Ingersoll & Rooney PC

(57) ABSTRACT

A device (1) for the feed of air to a compressor (2) of a gas turbine plant has an air inlet duct (8) and an air inlet chamber (9) which adjoins the air inlet duct. For the purpose of damping sound emissions of the compressor (2), a first and second inner wall (10, 11) of the inlet chamber (9) is at least partially lined by means of melamine foam. The invention is characterized by the advantages in that silencing is ensured both with wetness and with chemically aggressive conditions. The silencing device is consequently functionally reliable over an extended operating period.

17 Claims, 4 Drawing Sheets

U.S. PATENT DOCUMENTS

| | | |
|---|---|---|
| 5,709,529 A | 1/1998 | Parzych |
| 6,182,787 B1 | 2/2001 | Kraft et al. |
| 6,260,658 B1 | 7/2001 | Darrell et al. |
| 6,539,702 B2 * | 4/2003 | Nishimura et al. ............ 60/39.5 |
| 6,607,817 B1 * | 8/2003 | Imashiro et al. ........... 428/319.3 |
| 6,672,424 B2 * | 1/2004 | Gadefait et al. .............. 181/225 |
| 6,705,428 B2 * | 3/2004 | Kudernatsch ................ 181/224 |
| 2003/0072648 A1 * | 4/2003 | Han et al. .................... 415/119 |

FOREIGN PATENT DOCUMENTS

| | | |
|---|---|---|
| DE | 296 14 495 U1 | 1/1997 |
| DE | 101 51 474 A1 | 5/2002 |
| EP | 0 754 901 A1 | 1/1997 |
| EP | 0 953 964 A2 | 11/1999 |
| EP | 1 336 695 A1 | 8/2003 |
| GB | 1 054 793 | 1/1967 |
| GB | 2 251 719 A | 7/1992 |
| GB | 2 277 710 A | 9/1994 |
| WO | WO 97/12134 A1 | 4/1997 |
| WO | WO 02/065447 A2 | 8/2002 |

* cited by examiner

SOUND ABSORBER FOR GAS TURBINE INSTALLATIONS

TECHNICAL FIELD

The invention relates to a device for inlet of air to a compressor of a gas turbine plant, and especially relates to a device for damping sound emissions of the compressor.

BACKGROUND OF THE INVENTION

The operation of gas turbine plants, and especially of their compressors, is accompanied by considerable sound emissions. Therefore, the air inlet ducts to the compressors are equipped with different devices for silencing.

A sound damper, or "silencer", in an air inlet duct to a compressor for a gas turbine plant is disclosed for example in U.S. Pat. No. 6,260,658. The silencer is arranged in the front horizontally disposed region of the inlet-duct, and perpendicular to the flow direction of the incoming air, across the entire cross section of the inlet duct. It comprises a plurality of damper units which extend in parallel and are spaced apart by means of interspaces, wherein the inducted air flows through the interspaces. The damper units contain sound-absorbing material consisting of foam, wool, mineral wool, fiberglass or basalt wool.

A further system for silencing in a turbomachine is known from U.S. Pat. No. 5,709,529. It comprises a combination of curved baffle plates which extend parallel to one another and are arranged in a bend of an inlet duct, and a sound-absorbing lining of the inner walls of an inlet chamber directly upstream of the inlet to the turbomachine. In this case, the curved baffle plates are arranged at specific distances from one another according to the bend radius of the air inlet duct. The system achieves the effect of so-called "spinning mode tone harmonics" which occur in turbomachines, especially in aircraft engines, as a result of the interaction of rotor and stator blades of the turbomachine, being toned out. For this purpose the sound-damping lining is oriented perpendicularly to the direction of motion of the "spinning mode tones". The lining for example consists of mineral wool, fibreglass or ceramic fibers.

In the air inlet duct to the compressor of a gas turbine plant, considerable moisture often occurs, especially when using "fogging" methods, that is by specific wetting of the air for the purpose of more efficient operation of the gas turbine plant. Furthermore, the components of the air inlet duct are loaded with $SO_2$, salts and other aggressive chemical substances. The use of the described silencing devices in air inlet ducts, which are chemically loaded and/or loaded with moisture, would lose effectiveness on account of their material selection, since on the one hand the sound-damping action is reduced, and on the other hand the materials would degrade. Glass fibers in particular lose their capability for sound damping in the event of moisture, while mineral wool, rock wool and also polyurethane foam are not materially resistant in the case of attack by salts or sulphur dioxide.

SUMMARY OF THE INVENTION

Starting from the known prior art, the object of the present invention is based on creating an improved device for damping sound emissions of a compressor of a gas turbine plant, which ensures a reliable silencing quality during different operating conditions, especially in the case of loading by moisture, for example as occurs when using "fogging" operating methods, and by chemical substances. In particular, an effective silencing is to be ensured over an extended operating period.

A device for the air inlet to a compressor of a gas turbine plant has an air inlet duct, and an air inlet chamber which adjoins the air inlet duct and leads into an air inlet opening of the compressor. The air inlet chamber has a device for damping sound emissions of the compressor. The device according to the invention is attached on those inner walls of the inlet chamber which extend opposite the compressor inlet opening and also in the plane of the compressor inlet opening. In particular, the device according to the invention has melamine foam as sound-damping material.

The silencing device according to the invention demonstrates the advantages of it having an increased sound-damping quality compared with known devices with conventional sound-damping materials, such as mineral wool or glass fibers. In addition, and for achieving the set object in a decisive manner, the melamine foam has an adequate sound-damping quality both in the case of dry and moist or wet operating conditions, wherein this sound-damping quality is especially also ensured over extended operating periods. This on the one hand is based upon the knowledge that melamine foam can deflect water and maintains its shape and its volume in the case of moisture or wetness, and in addition is also chemically resistant, especially against the substances which appear in gas turbine plants, such as salts, sulphur dioxide, as well as the cleaning agent which is used for cleaning the compressor. It has been shown in particular that with these chemically aggressive conditions no degradation or shrinking of the material occurs, as, for example, is encountered with polyurethane or mineral wool. On the other hand, it is based upon the knowledge that in particular the sound-damping quality of melamine foam is maintained during the wet and/or chemically aggressive conditions of a gas turbine plant so that a stable sound-damping action is made possible over an extended operating period.

In addition, the melamine foam is especially suitable for use in the aforementioned silencing device by it not being inflammable. This characteristic is therefore advantageous for this application because, as a result, welding processes are possible when fastening the melamine foam. If the damping material which is used were to be inflammable, however, other fastening methods would have to be used, which, in an air inlet chamber of a gas turbine, are less advantageous than welding.

Finally, the melamine foam is characterized in that it is inexpensive.

The arrangement of the silencing device on a first inner wall of the inlet chamber opposite the compressor inlet, and also on a second inner wall which lies opposite it, effects damping of a greater part of the sound waves from the compressor which strike the first inner wall, as well as the sound waves which, by reflection, strike the second inner wall.

In a first preferred embodiment of the invention, the melamine foam, which is used for sound damping, is located in prefabricated, perforated holders which are fastened as a whole on the inner walls of the inlet chamber by them being embedded between ribs which are arranged on the inner walls in a latticed manner, and are secured on the ribs by means of locking plates.

In a second preferred embodiment of the invention, the device again comprises ribs which are arranged in a latticed manner on the inner walls of the inlet chamber, wherein melamine foam is laid between the ribs in each case and held in place by means of perforated plates which extend across the foam. The perforated plates are protected from falling out by means of locking plates which are attached in each case at the intersecting points of the ribs.

In the two embodiments, the locking plates are preferably connected to the ribs by welding. Welding is possible thanks to the non-inflammability of the melamine foam. As a result of the welding, especially small components such as screws and bolts, which in the case of becoming loose could get into the compressor and could cause damage to the blading there, are completely avoided.

When selecting the mass both of the perforated plates and of the prefabricated holders, their natural vibrations are taken into account in each case. For this purpose, the dimensions of the plates and holders are correspondingly selected so that vibrations, which would excessively stress the fastening of the locking plates and the fastening on the inner walls, are avoided.

In a further preferred embodiment of the device, the inner walls of the inlet chamber which are referred to are at least partially covered by the silencing device. In special embodiments, at least 70% or 80% of the inner wall surfaces which are referred to are covered by the device.

EMBODIMENT OF THE INVENTION

Figure 1:
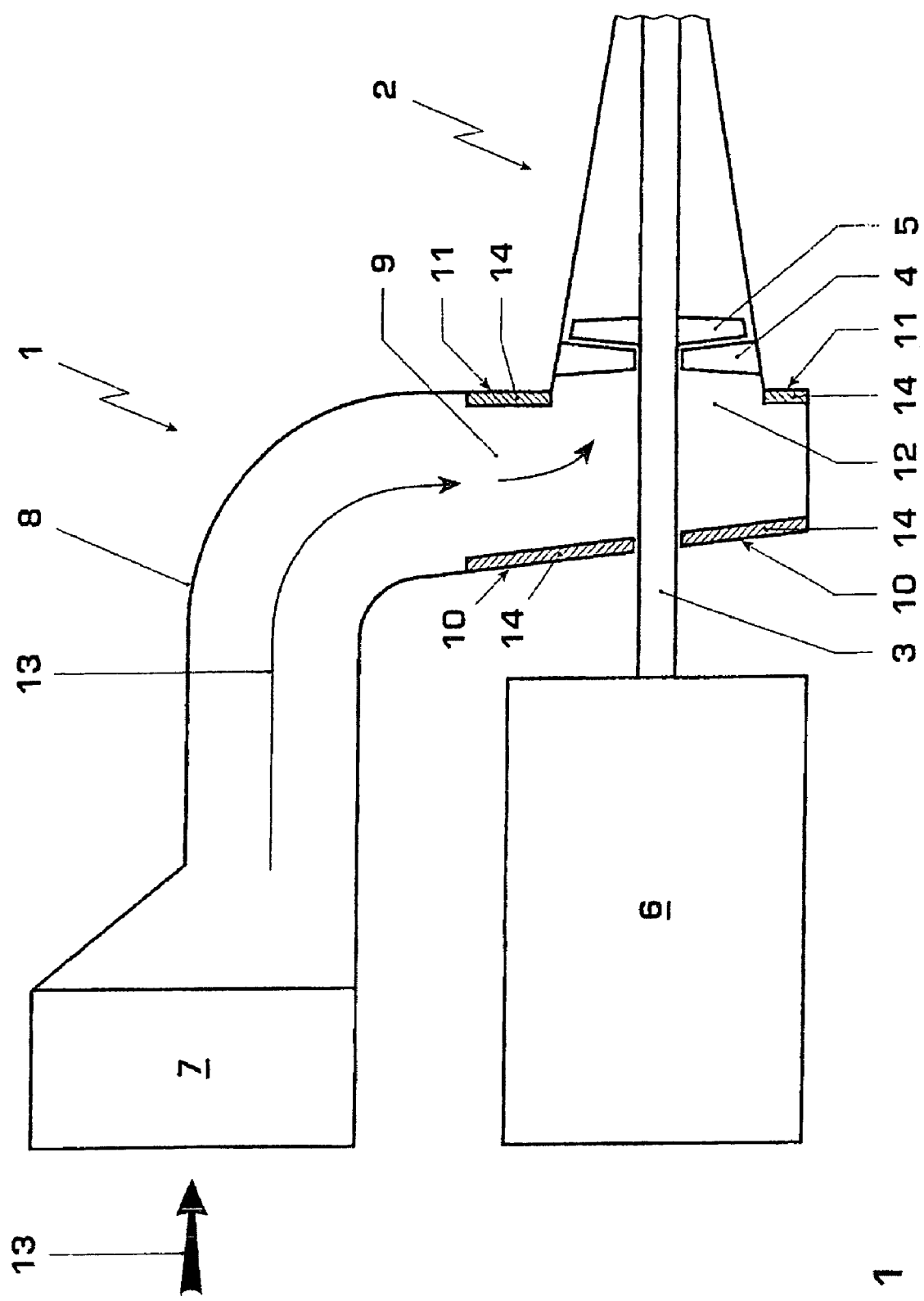
FIG. 1 shows a section through an air inlet device of a gas turbine plant, with the silencing device according to the invention.

FIG. 1 shows in section an air inlet device 1 to a compressor 2 of a gas turbine plant. Of the gas turbine plant, only the rotor 3, the first stator and rotor blade rows 4 and 5 of the compressor 2, and also the housing 6 of the generator, are shown. The air inlet device 1 comprises a weather hood 7, in which a filter system is arranged, and an air inlet duct 8, to which an air inlet chamber 9, which leads into an inlet opening 12 of the compressor 2, is connected downstream of a bend of the air inlet duct. The air inlet chamber 9 comprises a first, slightly angled wall 10 opposite the inlet opening 12 to the compressor 2, with an opening for the rotor 3, and a second wall 11 in the plane of the inlet opening 12 to the compressor 2. The air flow to the compressor 2 is indicated by the arrow 13. According to the invention, the air inlet chamber 9 has a silencing device 14 (shown by shading) with sound-damping material, especially consisting of melamine foam, with which the walls 10 and 11 are at least partially covered.

Figure 2:
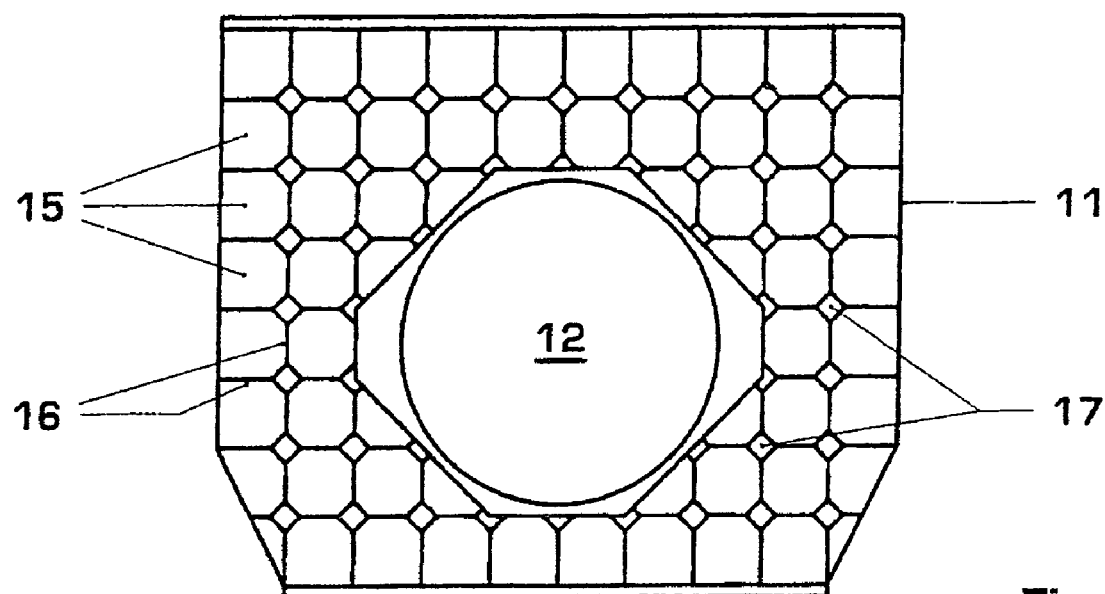
FIG. 2 shows a front view of the inner wall of the air inlet chamber with inlet opening to the compressor, with the device according to the invention with ribs which are arranged in a latticed manner, and prefabricated holders for the melamine foam which are arranged between the ribs.

FIG. 2 shows in a front view an example of a lining of the wall 11 with melamine foam, which is embedded in prefabricated, rectangular holders. Each holder 15 is laid in each case between ribs 16 which are arranged on the wall 11 in a latticed manner. A locking plate 17 is fastened by welding across the corner sections of the holders 15 in each case at each intersecting point between horizontally and vertically extending ribs 16, which prevents the holders from falling out. The prefabricated holders in this exemplary embodiment are of rectangular construction and are arranged in an "edgewise" manner by the short sides of the rectangles extending horizontally.

Figure 3:
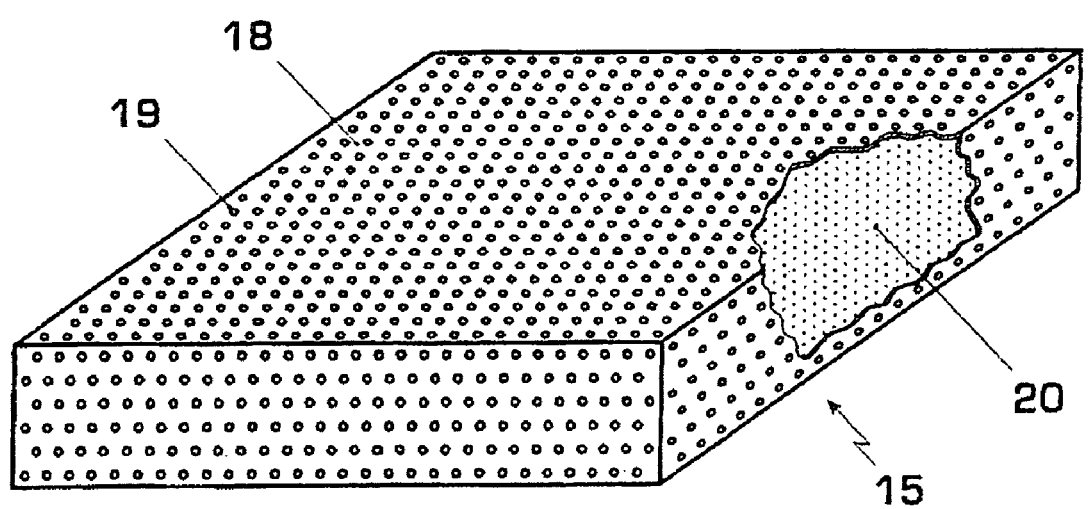
FIG. 3 shows a perspective view of a prefabricated holder for the melamine foam.

FIG. 3 shows an example of a prefabricated holder 15. It comprises a metal plate 18 which on all sides encloses the melamine foam 20, which in this case for example is formed as a cuboid, and is perforated with openings 19 which are arranged in an offset manner. The dimensions of the holders 15 are selected so that these do not incur natural vibrations as a result of which the fastening would become overstressed.

Figure 4:
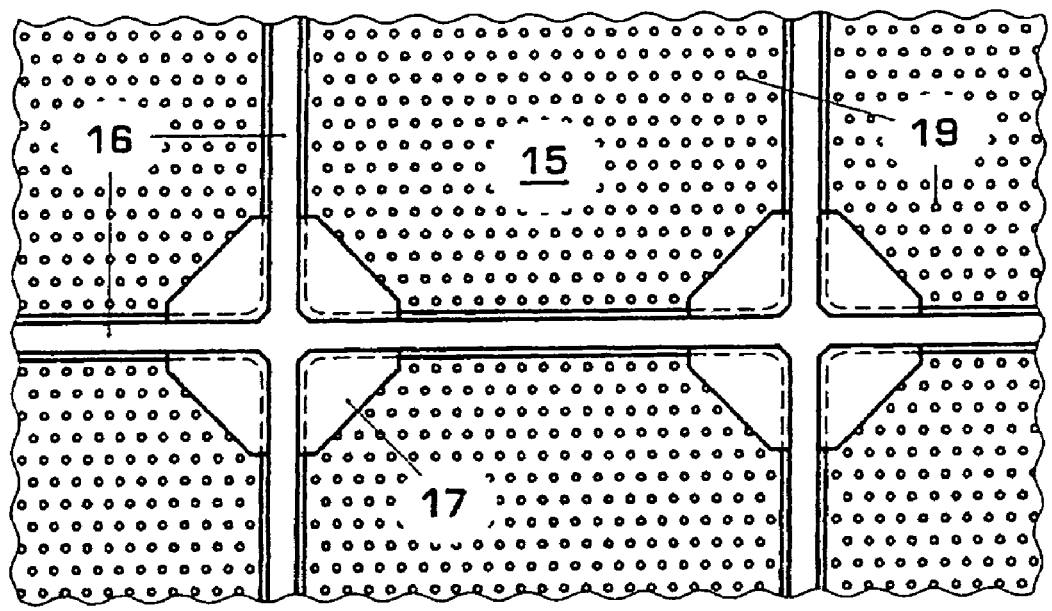
FIG. 4 shows a detailed view of the arrangement of the prefabricated holders between the ribs and of the locking plates for fastening at the intersecting points of the ribs.

FIG. 4 shows in detail the first preferred embodiment of the invention, in which the holders 15 are fastened by means of locking plates 17 which at the intersecting points of the ribs 16 are welded to the plates 18 of the holders 15 and to the ribs 16.

Figure 5:
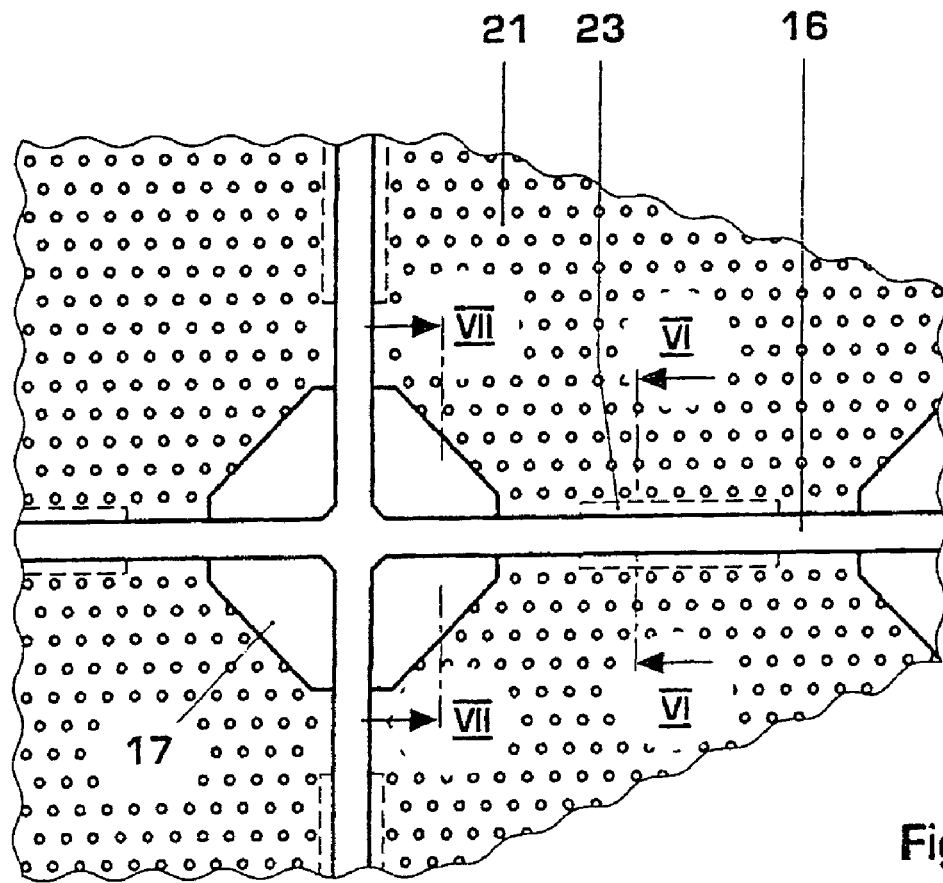
FIG. 5 shows a detailed view of the arrangement of the perforated plates over the melamine foam and of the locking plates at the intersecting points of the ribs.

FIG. 5 shows the second preferred embodiment of the invention, which is fastened to the melamine foam by means of plates and locking plates. Ribs 16 are again arranged in a latticed manner on the inner walls of the inlet chamber, as shown in FIG. 2. The melamine foam in this case is embedded directly between the ribs 16 and is covered in each case with perforated plates 21. The perforating, as in the previously shown example of the holders 15, consists of openings which are arranged in an offset manner. Such an arrangement of the openings proves to be advantageous for reasons of manufacture and strength. Four-sided locking plates 17 are welded at the intersecting points of the ribs 16 to the ribs and to the plates 21, as shown in FIG. 7. Furthermore, lateral crosspieces 23 are arranged over a given area between the intersecting points of the ribs 16 for the purpose of fastening the plates to the ribs 16 by welding, as shown in FIG. 6.

Figure 6:
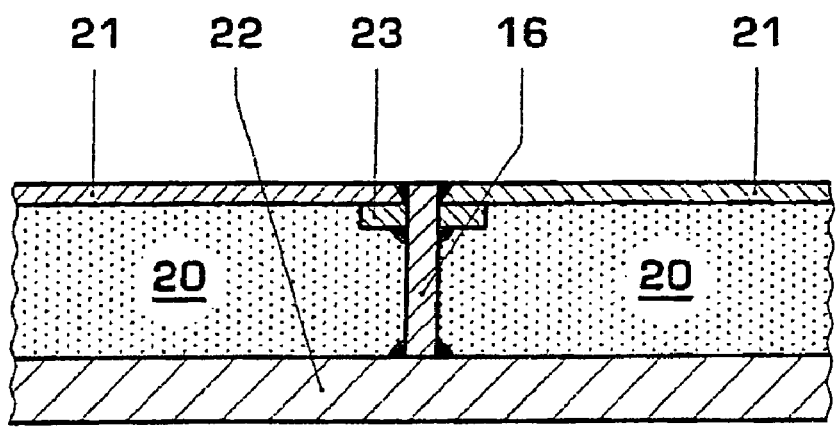
FIG. 6 shows a cross-sectional view according to VI-VI in FIG. 5 of the arrangement of the perforated plates on crosspieces on the ribs.
Figure 7:
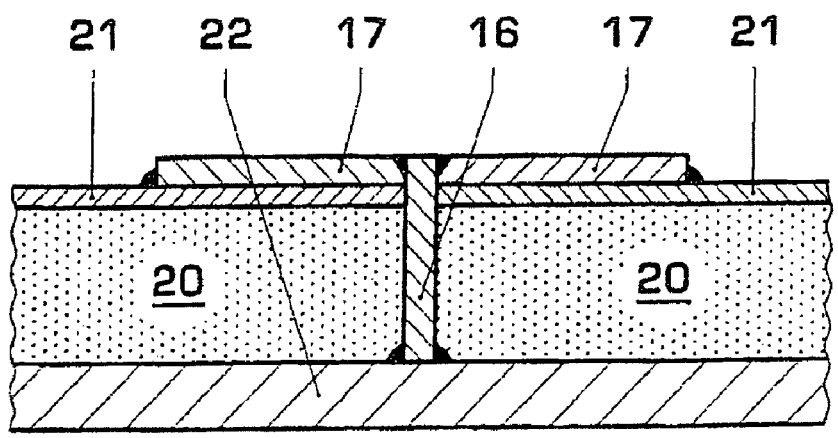
FIG. 7 shows a cross-sectional view VII-VII in FIG. 5 of the fastening of the perforated plates by means of locking plates.

FIG. 6, in accordance with section VI-VI in FIG. 5, shows an outer wall 22 of the inlet chamber, and a rib 16 which is welded to the wall 22. The melamine foam 20 lies upon the outer wall 22 and is covered by the plate 21. The plate 21 is arranged on a lateral crosspiece 23, which is welded to the rib 16, and is welded to this. The crosspieces 23 have the additional advantage that they stiffen the inlet chamber.

FIG. 7, in accordance with section VII-VII in FIG. 5, shows the fastening by means of the locking plates 17 in the region of the intersecting points of the ribs 16. The melamine foam 20 lies between the outer wall 22 and perforated plates 21, and the sections of a locking plate 17 are each welded to the rib 16 and to the plates 21.

The dimensions of the perforated plates 21 are again selected in accordance with their natural frequencies.

The inner walls 10 and 11 are at least partially lined either by means of the prefabricated holders 15 or by means of the melamine foam and the covering perforated plates 21. The degree of lining of at least 70% of the total area of the walls 10 and 11 brings about an adequate sound absorption, wherein a degree of lining of at least 80% is optimum.

The melamine foam in all of the embodiments which are referred to have a thickness which corresponds to a quarter of the sound wave length of that sound wave which occurs the strongest in the sound spectrum. It is assumed from this that the maximum of a sound wave is absorbed at a quarter of its wave length. For example, the melamine foam has a thickness of 60 mm, preferably in the range of 45 to 60 mm. This corresponds to a quarter of the wave length of the sound at 1250 Hertz which issues as a first harmonic from the first two blade rows of the compressor. Sound of the harmonic frequencies is equally absorbed by the foam of this thickness range.

According to a variant of the invention, not only the first and second inner wall 10 and 11 of the inlet chamber 9 are lined, but also the rest of the inner walls of the inlet chamber, which connect the inner walls 10 and 11, are lined. This ensures optimization of the silencing by damping the sound waves which emanate from the compressor at an angle to the rotor and which strike these lateral inner walls.

LIST OF DESIGNATIONS

1 Air inlet device
2 Compressor
3 Rotor
4 Stator blade
5 Rotor blade
6 Generator housing
7 Filter housing
8 Air inlet duct
9 Inlet chamber
10 Inner wall of the inlet chamber
11 Inner wall of the inlet chamber in the plane of the compressor inlet opening
12 Inlet opening to the compressor
13 Air flow
14 Silencing device
15 Prefabricated holder
16 Ribs
17 Locking plates
18 Plate of the prefabricated holder
19 Perforating on the prefabricated holder
20 Melamine foam
21 Perforated plate
22 Outer wall of the inlet chamber
23 Shoulder, crosspiece on the ribs

The invention claimed is:

1. A device for inlet of air to a compressor of a gas turbine plant comprising:
   an air inlet duct and an air inlet chamber which adjoins the air inlet duct and leads to an inlet opening of the compressor; and
   a device for damping sound emissions from the compressor,
   wherein both a first inner wall of the inlet chamber, which lies opposite the inlet of the compressor, and a second inner wall, which lies opposite the first inner wall and in a plane of the inlet opening of the compressor, are at least partially lined in each case by a sound-damping material;
   wherein the first and second inner walls have ribs arranged in a latticed manner and the sound-damping material is arranged in each case in prefabricated holders which comprise perforated plates and enclose the sound-damping material, and the prefabricated holders are arranged between the ribs.

2. The device as claimed in claim 1, wherein in a region of the intersecting points of the ribs, locking plates are welded to the ribs and to the perforated plates of the prefabricated holders.

3. The device as claimed in claim 1, wherein the sound-damping material contains melamine foam.

4. The device as claimed in claim 1, wherein the first and second inner walls of the inlet chamber are each lined to at least 70% of their total area by means of the sound-damping material.

5. The device as claimed in claim 1, wherein the sound-damping material has a thickness which is equal to a quarter of a wavelength of a strongest one of plural sound waves which emanates from the compressor.

6. The device as claimed in claim 1, wherein
   the first and second inner walls are each lined to at least 80% of their total area by means of the sound-damping material.

7. The device as claimed in claim 1, wherein
   the sound-damping material has a thickness in a region of from 45 to 60 mm.

8. The device as claimed in claim 1, comprising:
   further inner walls of the inlet chamber, which connect the first inner wall and the second inner wall, and which are at least partially lined by means of the sound-damping material.

9. The device as claimed in claim 1, wherein
   the ribs have crosspieces in each case on both sides, which are welded to the perforated plates which cover the sound-damping material.

10. A device for inlet of air to a compressor of a gas turbine plant comprising:
    an air inlet duct and an air inlet chamber which adjoins the air inlet duct and leads to an inlet opening of the compressor; and
    a device for damping sound emissions from the compressor,
    wherein both a first inner wall of the inlet chamber, which lies opposite the inlet of the compressor, and a second inner wall, which lies opposite the first inner wall and in a plane of the inlet opening of the compressor, are at least partially lined in each case by a sound-damping material;
    wherein the first and second inner walls have ribs arranged in a latticed manner and sound-damping material is laid directly between the ribs and is covered in each case by a perforated plate; and
    wherein the ribs have crosspieces in each case on both sides which are welded to the perforated plates which cover the sound-damping material.

11. The device as claimed in claim 10, wherein
    the first and second inner walls are each lined to at least 80% of their total area by means of the sound-damping material.

12. The device as claimed in claim 10, wherein
    the sound-damping material has a thickness in a region of from 45 to 60 mm.

13. The device as claimed in claim 10, comprising:
    further inner walls of the inlet chamber, which connect the first inner wall and the second inner wall, and which are at least partially lined by means of the sound-damping material.

14. The device as claimed in claim 10, wherein
    in a region of intersecting points of the ribs, locking plates are welded to the ribs and to the perforated plates which cover the sound-damping material.

15. The device as claimed in claim 10 wherein
    the first and second inner walls of the inlet chamber are each lined to at least 70% of their total area by means of the sound-damping material.

16. The device as claimed in claim 10, wherein the sound-damping material has a thickness which is equal to a quarter of a wavelength of a strongest one of plural sound waves which emanates from the compressor.

17. The device as claimed in claim 10, wherein the sound-damping material contains melamine foam.

* * * * *